(12) United States Patent
Sommerlade et al.

(10) Patent No.: US 11,714,881 B2
(45) Date of Patent: Aug. 1, 2023

(54) IMAGE PROCESSING FOR STREAM OF INPUT IMAGES WITH ENFORCED IDENTITY PENALTY

(71) Applicant: Microsoft Technology Licensing, LLC, Redmond, WA (US)

(72) Inventors: Eric Chris Wolfgang Sommerlade, Oxford (GB); Sunando Sengupta, Reading (GB); Alexandros Neophytou, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 17/331,876

(22) Filed: May 27, 2021

(65) Prior Publication Data
US 2022/0383034 A1 Dec. 1, 2022

(51) Int. Cl.
*G06K 9/00* (2022.01)
*G06F 18/24* (2023.01)
(Continued)

(52) U.S. Cl.
CPC .... *G06F 18/24765* (2023.01); *G06F 18/2413* (2023.01); *G06N 3/04* (2013.01);
(Continued)

(58) Field of Classification Search
CPC .......... G06K 9/626; G06K 9/627; G06N 3/04; G06T 3/4053; G06T 5/50; G06T 7/194; G06T 2207/20221; G06T 2207/30196
See application file for complete search history.

(56) References Cited

U.S. PATENT DOCUMENTS 8,861,893 B2 10/2014 Chen et al.
10,621,415 B2 4/2020 Li et al.
(Continued)

FOREIGN PATENT DOCUMENTS

JP 2004086793 A 3/2004
JP 4150554 B2 * 9/2008
(Continued)

OTHER PUBLICATIONS

Gutiérrez, et al., "Color Reconstruction and Resolution Enhancement Using Super-Resolution", In Journal of Colorimetry and Image Processing, Jan. 2018, pp. 43-60.
(Continued)

*Primary Examiner* — Andrew M Moyer

(57) ABSTRACT

A method of improving image quality of a stream of input images is described. The stream of input images, including a current input image, is received. One or more target objects, including a first target object, are identified spatio-temporally within the stream of input images. The one or more target objects are tracked spatio-temporally within the stream of input images. The current input image is segmented into i) a foreground including the first target object, and ii) a background. The foreground is processed to have improved image quality in the current input image. Processing of the foreground further comprises processing the first target object using a same processing technique as for a prior input image of the stream of input images based on the tracking of the first target object. The background is processed differently from the foreground. An output image is generated by merging the foreground with the background.

20 Claims, 8 Drawing Sheets

(51) Int. Cl.
  *G06T 7/194* (2017.01)
  *G06N 3/04* (2023.01)
  *G06T 3/40* (2006.01)
  *G06T 5/50* (2006.01)
  *G06F 18/2413* (2023.01)

(52) U.S. Cl.
  CPC .............. *G06T 3/4053* (2013.01); *G06T 5/50* (2013.01); *G06T 7/194* (2017.01); *G06T 2207/20221* (2013.01); *G06T 2207/30196* (2013.01)

(56) References Cited

U.S. PATENT DOCUMENTS

| | | | |
|---|---|---|---|
| 2003/0012414 A1 | 1/2003 | Luo | |
| 2003/0063781 A1 | 4/2003 | Philomin et al. | |
| 2005/0212913 A1 | 9/2005 | Richter | |
| 2012/0051658 A1* | 3/2012 | Tong | G11B 27/34 382/224 |
| 2012/0249726 A1 | 10/2012 | Corcoran et al. | |
| 2012/0299906 A1 | 11/2012 | Shiell et al. | |
| 2013/0169760 A1 | 7/2013 | Watts | |
| 2014/0160340 A1 | 6/2014 | Farnand et al. | |
| 2015/0195491 A1* | 7/2015 | Shaburov | G06V 10/40 348/14.12 |
| 2016/0253784 A1 | 9/2016 | Chen et al. | |
| 2020/0090388 A1 | 3/2020 | Kamoda et al. | |

FOREIGN PATENT DOCUMENTS

| | | |
|---|---|---|
| WO | 2019105399 A1 | 6/2019 |
| WO | 2020050686 A1 | 3/2020 |

OTHER PUBLICATIONS

Ignatov, et al., "DSLR-Quality Photos on Mobile Devices with Deep Convolutional Networks", In Proceedings of IEEE International Conference on Computer Vision, Oct. 22, 2017, pp. 3277-3285.

Zhu, et al., "Improving Semantic Segmentation via Video Propagation and Label Relaxation", In Proceedings of the IEEE Conference on Computer Vision and Pattern Recognition, Jun. 16, 2019, pp. 8856-8865.

Kazemi, et al., "One Millisecond Face Alignment with an Ensemble of Regression Trees", In Proceedings of the IEEE conference on computer vision and pattern recognition, Jun. 23, 2014, 8 Pages.

Ledig, et al., "Photo-Realistic Single Image Super-Resolution Using a Generative Adversarial Network", In Journal of Computing Research Repository, Sep. 2016, pp. 4681-4690.

Viola, et al., "Rapid Object Detection using a Boosted Cascade of Simple Features", In Proceedings of the IEEE Computer Society Conference on Computer Vision and Pattern Recognition, Dec. 8, 2001, 9 Pages.

Jagdale, et al., "A Novel Algorithm for Video Super-Resolution", In Journal of Information and Communication Technology for Intelligent Systems, Dec. 30, 2018.

"International Search Report and Written Opinion Issued in PCT Application No. PCT/US22/027189", dated Aug. 10, 2022, 11 Pages.

Zhang, et al., "Super-Identity Convolutional Neural Network for Face Hallucination", In Proceedings of the European Conference on Computer Vision, Oct. 6, 2018, pp. 196-211.

* cited by examiner

IMAGE PROCESSING FOR STREAM OF INPUT IMAGES WITH ENFORCED IDENTITY PENALTY

BACKGROUND

Superresolution and Color reconstruction are image processing techniques for improving image quality. Superresolution (SR) is the creation of high resolution imagery from inputs that have lower resolution in one or multiple channels (e.g. intensity or color information). Color Reconstruction (CR) adjusts pixel values from different sensor modalities to resemble recordings from other systems, e.g. an inexpensive VGA sensor and plastic lens system may be used to generate digital single lens reflex (DSLR)-like output. Color reconstruction also allows an increase in bitdepth of a signal from, for example, 8 bits per channel (for each of Red, Green, and Blue channels) to 12 bits per channel by taking into account semantic information. Typically, superresolution and color reconstruction operations are expensive, especially in the case of high definition imagery. In some scenarios, such as video input streams used for video communication, improved image quality is not necessary for an entire image. For example, portions of an image that show a background are less relevant to a participant on the video communication than another participant on the video communication.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving image quality of a stream of input images.

In one aspect, a method of improving image quality of a stream of input images is provided. The method comprises: receiving the stream of input images, including receiving a current input image; identifying one or more target objects, including a first target object, spatio-temporally within the stream of input images; tracking the one or more target objects, including the first target object, spatio-temporally within the stream of input images; segmenting the current input image into i) a foreground including the first target object, and ii) a background; processing the foreground to have improved image quality in the current input image, wherein the processing of the foreground further comprises processing the first target object using a same processing technique as for a prior input image of the stream of input images based on the tracking of the first target object; processing the background of the current input image differently from the foreground of the current input image; and generating an output image by merging the foreground and the first target object with the background.

In another aspect, a system for improving image quality of a stream of input images is provided. The system includes a processor and a memory storing computer-executable instructions that when executed by the processor cause the system to: receive the stream of input images, including receiving a current input image; identify one or more target objects, including a first target object, spatio-temporally within the stream of input images; track the one or more target objects, including the first target object, spatio-temporally within the stream of input images; segment the current input image into i) a foreground including the first target object, and ii) a background; process the foreground to have improved image quality in the current input image, wherein the processing of the foreground further comprises processing the first target object using a same processing technique as for a prior input image of the stream of input images based on the tracking of the first target object; process the background of the current input image differently from the foreground of the current input image; and generate an output image by merging the foreground and the first target object with the background.

In yet another aspect, a stream processor is provided. The stream processor includes a segmentation processor configured to: identify one or more target objects, including a first target object, spatio-temporally within the stream of input images; track the one or more target objects, including the first target object, spatio-temporally within the stream of input images; and segment the current input image into i) a foreground including the first target object, and ii) a background. The stream processor also includes a foreground processor configured to process the foreground to have improved image quality in the current input image, wherein the processing of the foreground further comprises processing the first target object using a same processing technique as for a prior input image of the stream of input images based on the tracking of the first target object. The stream processor also includes a background processor configured to process the background of the current input image differently from the foreground of the current input image. The stream processor also includes a merge processor configured to generate an output image corresponding to the current input image by merging the foreground and the first target object with the background.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

Figure 1:
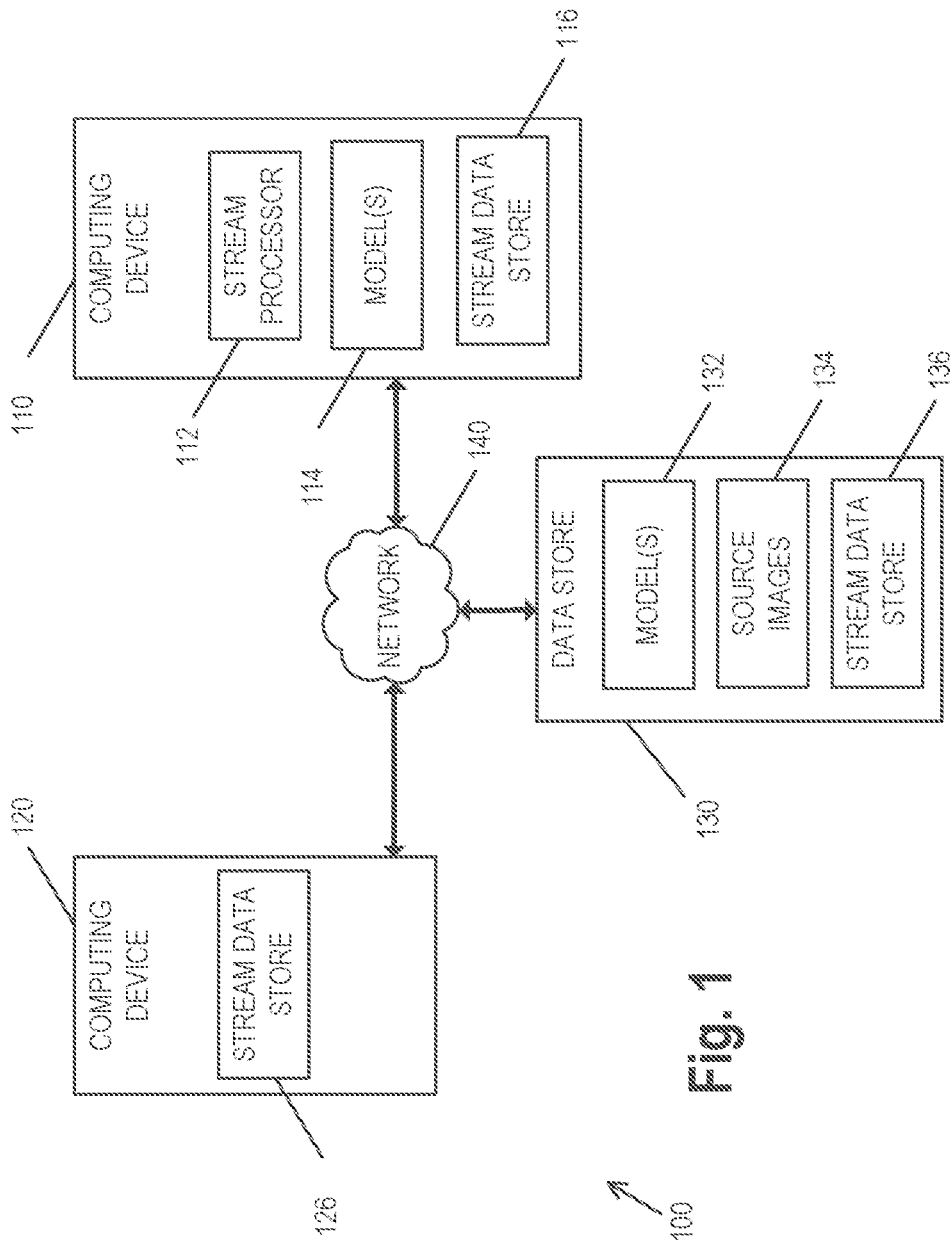
FIG. 1 shows a block diagram of an example of a communication system in which a stream processor may be implemented, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a stream processor configured to improve image quality of a stream of input images. The examples provide a more efficient use of superresolution, color reconstruction, or other image processing techniques in scenarios such as video conferencing, where the focus of a video stream is primarily on participants in a foreground, rather than a background. In particular, image processing techniques may be applied on the foreground occupied by at least one main participant in a video conferencing stream. The background region is processed using simpler methods, e.g. bilinear or nearest neighbor interpolation, or blurred to remove background detail. In other scenarios, one or more target objects within a video stream are identified for the foreground and processed to have improved image quality, while remaining background portions of the video stream are not processed, or are processed to a lesser extent than the foreground. Accordingly, computationally expensive processing for image quality is performed on regions that are relevant to a user (e.g., most likely to be closely watched by the user) and the processing is reduced for the background.

In some embodiments, a level of augmentation of an image processing technique performed on a target object is adjusted based on metadata associated with the target object. For example, the level of augmentation (e.g., how much an image has been augmented or changed) may be adjusted according to a texture attribute, a color attribute, an edge pattern attribute, and/or a facial feature attribute to maintain an identity of a particular target object. In one such scenario, an image of a user who has wrinkles or a distinct nose profile is processed to ensure that the user's distinctive features remain distinctive and helpful to identify the user. In some embodiments, the target objects of a video stream are tracked and image processing techniques for each target object are generally maintained at consistent levels based on the tracking. As an example, a history of a target object in a video stream and the image processing techniques performed on that target object are maintained and thus, sudden changes in image processing techniques are avoided (e.g., changes in color, lighting, etc.), which provides improved continuity for viewers of the video stream.

This and many further embodiments for a computing device are described herein. For instance, FIG. 1 shows a block diagram of an example of a communication system 100 in which a stream processor 112 may be implemented by a computing device 110, according to an example embodiment. As shown in FIG. 1, communication system 100 includes the computing device 110, a computing device 120, and a data store 130. A network 140 communicatively couples computing device 110, computing device 120, and data store 130.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). In some embodiments, computing device 110 is a cable set-top box, streaming video box, or console gaming device. Computing device 110 may be configured to execute one or more software applications (or "applications") and/or services and/or manage hardware resources (e.g., processors, memory, etc.), which may be utilized by users (e.g., customers) of the computing device 120.

The computing device 110 includes a stream processor 112, one or more neural network models 114, and optionally, stream data store 116. The stream processor 112 is configured to receive a stream of input images and generate corresponding output images having improved image quality, as described herein. In some embodiments, the stream of input images is received from another computing device, such as the computing device 120, the data store 130, or another suitable device. In an embodiment, the computing device 110 receives the stream of input images from the stream data store 116. The stream data store 116 may be a local computer-readable media, such as a solid state drive, read-only memory, optical disk, magnetic storage drive, or other suitable data store. In various embodiments, the stream of input images are received from a video input source, such as a webcam or other image sensor, a video player, a DVD player, a video streaming application, or other suitable source. The stream of input images may be a live stream, a recorded stream, a recorded movie, or other suitable stream of images. The stream of input images may have any suitable input size or format. In general, the stream of input images may be considered to include a current input image that is currently processed by the computing device 110, one or more prior input images that have previously been processed by the computing device 110 (e.g., earlier within the stream), and one or more subsequent input images that have yet to be processed (or even arrive) at the computing device 110.

Although only one neural network model 114 is shown in FIG. 1, the computing device 110 may include one, two, three, or more neural network models 114 that are trained for different tasks. In some embodiments, the neural network models 114 are integral with the stream processor 112. In one embodiment, an instance of the neural network model 114 is configured to receive an input image, or a portion thereof, perform an image processing technique, and provide an output image. In various embodiments, the neural network model 114 may perform an image processing technique, such as a superresolution technique, to increase an image size from, for example, an original image size of 160×240 to a target image size of 480×960. In other scenarios, the superresolution technique increases an original size of 1920×1080 to a target image size of 3840×2160, 7,680×4320, or other suitable resolution. In still other scenarios, the superresolution technique increases fidelity and detail, but maintains a same spatial resolution. For example, the neural network model 114 processes a 1920×1080 video having a poor quality image capture or low bit-rate encoding (e.g., where the input image appears "pixelated") and improves the detail to reduce a pixilation effect while maintaining the 1920×1080 resolution.

In yet another embodiment, the neural network model 114 is configured to perform a color correction technique as the image processing technique. For example, the neural network model 114 improves a bit depth of color from 8 bits to 10 bits. In another embodiment, the neural network model 114 is a recurrent neural network model, convolutional neural network model, or other suitable neural network model that is configured to estimate a mask for segmenting an input image, as described herein.

The stream processor 112 is configured to segment an input image from a stream of input images into a "foreground" portion that contains a target object of the input image, and a "background" portion that contains a remainder of the input image. The target object may be a person in a video conference feed, an object of interest (e.g., a toy or coffee mug that may be held up to a camera), or other suitable target. In some embodiments, the input image contains two, three, or more target objects. In one such embodiment, the stream processor 112 segments each of the target objects into a same foreground portion. In another embodiment, at least some of the target objects are segmented into different foreground portions (e.g., into multiple foreground layers over a background layer). In an embodiment, an entire input image is designated as a foreground, for example, when a user's face is very close to a camera.

After segmentation, the stream processor 112 is configured to process the foreground layers and background layers separately using different image processing techniques. The stream processor 112 then merges the foreground and background to obtain an output image. The output image may be displayed on a local display device, transmitted to another display device, encoded, etc.

Computing device 120 may include one or more server devices, distributed computing platforms, and/or other computing devices. In some embodiments, computing device 120 is similar to computing device 110. The computing device 120 may include a stream data store 126, similar to the stream data store 116, that provides a stream of input images to the stream processor 112.

Data store 130 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The data store 130 may include a stream data store 136, similar to the stream data store 116, that provides a stream of input images to the stream processor 112. In some embodiments, the data store 130 includes a neural network model 132, similar to the neural network model 114. The data store 130 may also include one or more source images 134 for training the neural network models 114 and/or 132. In an embodiment, one or more data stores 130 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data stores 130 may be a datacenter in a distributed collection of datacenters.

Network 140 may comprise one or more networks such as local area networks (LANs), wide area networks (WANs), enterprise networks, the Internet, etc., and may include one or more of wired and/or wireless portions. Computing device 110 and computing device 120 may include at least one wired or wireless network interface that enables communication with each other and data store 130 (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

As used herein, the terms "input image" and "output image" include, but are not limited to images, video data (e.g., stills or frames of a video or streaming content), or other suitable image data. For example, images may include JPEG images, GIF images, BMP images, PNG images, RAW images, or other suitable image file formats.

Figure 2:
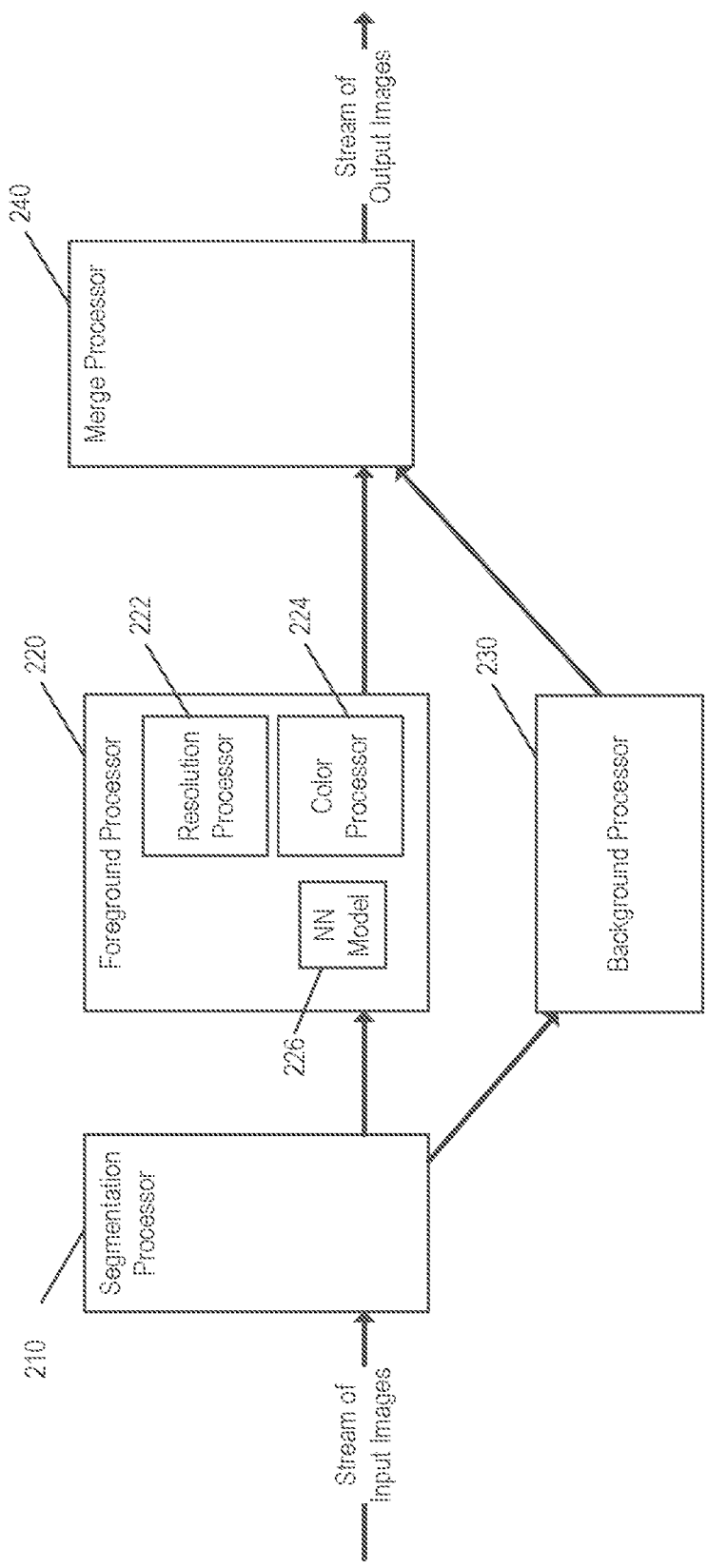
FIG. 2 shows a diagram of an example stream processor of the system of FIG. 1, according to an example embodiment.

FIG. 2 shows a diagram of an example stream processor 200 of the communication system 100 of FIG. 1, according to an example embodiment. The stream processor 200 generally corresponds to the stream processor 112, in some embodiments. The stream processor 200 includes a segmentation processor 210, a foreground processor 220, a background processor 230, and a merge processor 240.

The segmentation processor 210 is configured to identify and/or classify target objects, such as a person's face, upper body, a hand, a hat, bottle, mug, pen, or other object. The segmentation processor 210 may identify "landmarks" within the target objects, provide locations of the landmarks to an object tracker (e.g., object tracker 310, FIG. 3A), determine labels and/or metadata for pixels of the input image, and generate a mask, as described below. The mask, such as mask 350, identifies which portions of the input image are a foreground and a background, to be separately processed by the foreground processor 220 and the background processor 230, respectively.

The stream processor 200 is configured to improve an image resolution (with or without an upscale in size), improve image color (e.g., tone, color, saturation, sharpness, light level, contrast), and/or perform other image processing techniques on the stream of input images. However, the stream processor 200 performs different processing of regions within an input image depending on content within those regions. As discussed above, the segmentation processor 210 identifies and tracks target objects. In an embodiment, the stream processor 200 is configured to perform superresolution processing, color reconstruction processing, both superresolution processing and color reconstruction processing, and/or any suitable image processing technique in regions where target objects are located (i.e., the foreground) using the foreground processor 220. The remainder of the image ("background region") is processed by the background processor 230 using simpler image processing techniques, for example, bilinear or nearest neighbor interpolation. In some embodiments, the background region is processed to blur or remove background detail from the input image. In some embodiments, the stream processor 200 provides an output image having a target resolution (e.g., 1920×1080, 3840×2160, or other suitable resolution) and target bitdepth (e.g., 8 bit color, 10 bit color, etc.).

Figure 4:
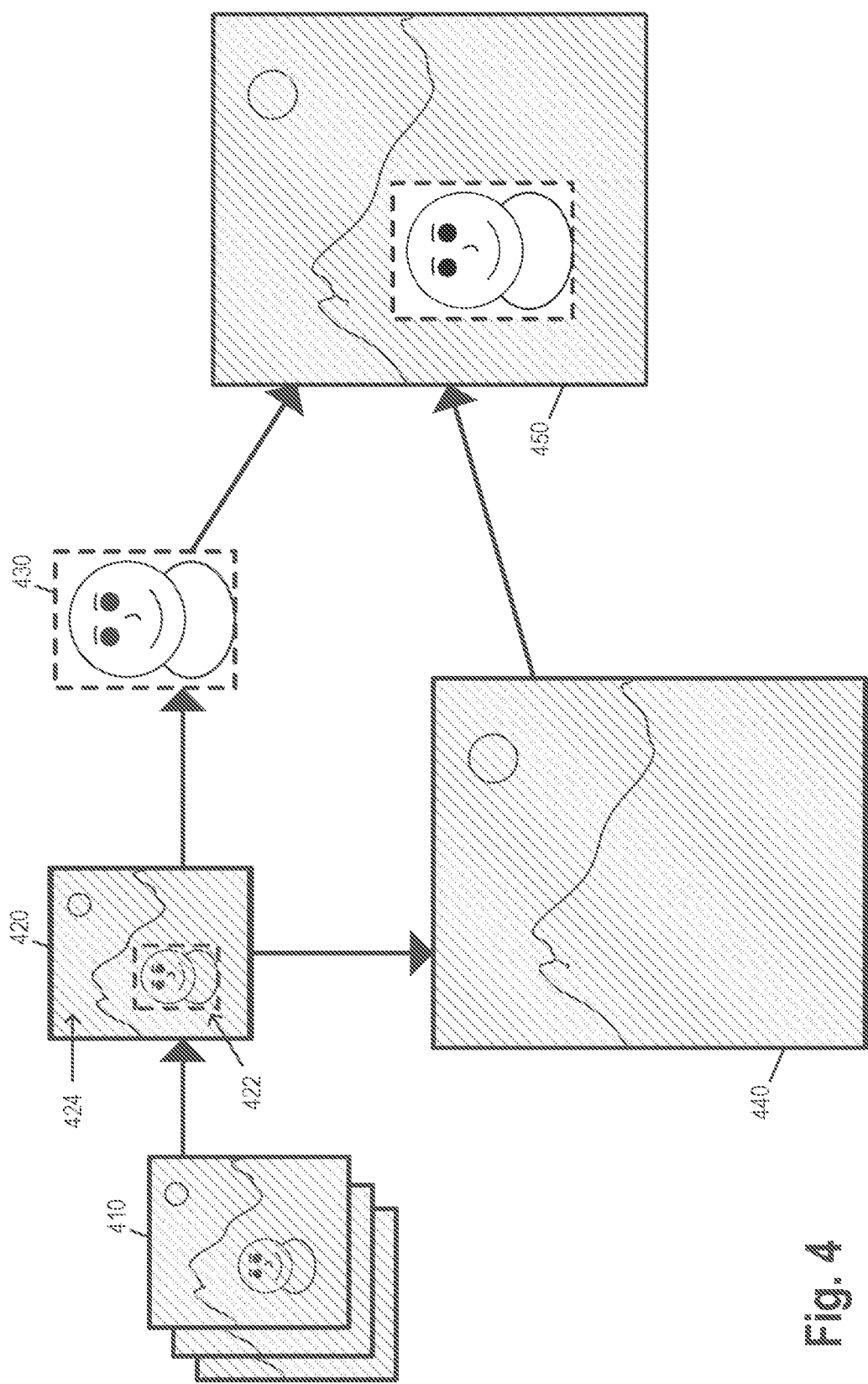
FIG. 4 shows a logical flow of images for improving image quality of a stream of input images, according to an example embodiment.

The foreground processor 220 receives an input image (or a copy thereof), performs one or more image processing techniques, and generates a foreground image (e.g., foreground image 430, FIG. 4). The foreground processor 220 includes a resolution processor 222 configured to improve the image resolution of a target object within the foreground. For example, the resolution processor 222 performs superresolution processing on the foreground. The foreground processor 220 also includes a color processor 224 configured to improve the color of the input image. For example, the color processor 224 performs color reconstruction processing and/or color correction on the foreground to improve tone, color, saturation, sharpness, light, and/or contrast. In an embodiment, the color processor 224 performs an increase in bitdepth of the input image from, for example, 8 bits per channel (for each of Red, Green, and Blue channels) to 12 bits per channel by taking into account semantic information from the segmentation processor 210, described below.

In some embodiments, the resolution processor 222 and the color processor 224 are combined into a single processor. The foreground processor 220 may utilize a neural network model, such as the neural network model 114 or neural network model 132, in support of the resolution processor 222 and/or the color processor 224. In some embodiments, the foreground processor 220 includes a neural network model 226, which generally corresponds to the neural network model 114.

The foreground processor 220 receives metadata from the segmentation processor 210 and, in some embodiments, utilizes the metadata to process the foreground of the input image. The metadata may include a classification of a target object, a unique identity of the target object, or various labels, such as a texture attribute (e.g., identifying a person's beard, a "fuzzy" or leather-like fabric), a color attribute, an edge pattern attribute, a facial feature attribute, or other suitable information. In an embodiment, for example, the foreground processor 220 is configured to perform a plurality of image processing techniques and selects a particular technique (or set of techniques) for a target object according to its classification or other metadata value. In an embodiment, the foreground processor 220 may select from a low, medium, and high level of detail for a processing technique, for example, selecting a "high" level of detail for a super-resolution processing technique on a beard or hair portion of a person or an embroidered portion of a garment, while selecting a "medium" level of detail for a face and a "low" level of detail for a plain knit shirt.

In some scenarios, the foreground processor 220 performs, two, three, or more image processing techniques on a target object. In other scenarios, the foreground processor 220 performs a first set of image processing techniques on a first target object of an input image, but performs a second set of different image processing techniques on a second target object of the input image. In some embodiments, the neural network model 114 is trained using labeled objects and configured to perform a particular image processing technique for a predetermined label.

In some embodiments, the foreground processor 220 is configured to perform an image processing technique and determines a level of detail of an enhancement provided by the image processing technique according to a classification, label, or other metadata value for a target object. This approach ensures that a unique identity or attributes of the target object are preserved in the output image, for example, by ensuring that key landmarks are not removed or rendered inconsistent with their appearance in the original image. For example, the segmentation processor 210 may label freckles, wrinkles, or other physical traits of a target object and maintain those traits in the output image. As another example, objects having a particular texture, color, or edge pattern are enhanced, but maintain their identity. In an embodiment, the neural network model 114 is configured to maintain these details using a corresponding error function during training of the neural network model 114. The error function may employ i) a classification penalty that reduces a likelihood of a classification being changed by the image processing technique, and/or ii) an identity penalty that reduces a likelihood of an identity of the target object being changed by the image processing technique.

The resolution processor 222 and/or the color processor 224 may be configured to utilize a respective instance of the neural network model 114 that is limited to target objects having a particular classification or other metadata value. Generally, by constraining one or both of the resolution processor 222 and the color processor 224 to particular target objects, the corresponding neural network models are smaller (i.e., fewer nodes and/or layers), which subsequently allows faster execution when processing an input stream. Moreover, constraining one or both of the resolution processor 222 and the color processor 224 to particular target objects reduces the number of images required to suitably train the neural network models 114, which means that the required dataset can be smaller and lower cost. Additionally, the neural network models 114 may store fewer weights and constants, thus having a smaller memory footprint, which may enable execution on a less powerful processor.

The resolution processor 222 may perform a superresolution technique that increases fidelity and detail, but maintains a same spatial resolution, providing an increase in image quality while having a same output size. In some scenarios, this allows for video to be improved on one computing device that implements the stream processor 200, then the improved video may be played back by a different computing device that does not have the stream processor 200. As an example, an input image may include a news anchor reading a script. The stream processor 200 improves a region of the image containing the news anchor in terms of fidelity, and optionally in spatial resolution. This region may then be imposed on the original input image, resulting in a same resolution of the output image, but higher quality and resolution of the "news anchor region".

The background processor 230 receives the input image (or a copy thereof), performs one or more image processing techniques, and generates a background image (e.g., background image 440). The background processor 230 is configured to process the background of the input image instead of the foreground. In some embodiments, the background processor 230 is less complex than the foreground processor 220, for example, by performing less computationally expensive image quality techniques. In an embodiment, for example, the background processor 230 is configured to perform a bilinear or nearest neighbor upsampling technique to a target resolution. In some embodiments, the background processor 230 performs a blur (average blur, Gaussian blur, or similar process that removes detail) on the input image. In one embodiment, the background processor 230 replaces at least some of the pixels in the background with image data from another source, such as a virtual background (e.g. an image selected by a user or generated using other means). In one embodiment, the background processor 230 performs color correction on the input image, per pixel, using a same correction matrix for all background pixels. The bitdepth may be adjusted by bit shifting or multiplying by an appropriate constant value, in various embodiments.

The foreground processor 220 is applied to pixels in the mask 350 which are set to "foreground", or where a fractional value of the mask 350 is not 100% background. Similarly, the background processor 230 is applied to pixels in the mask 350 which are set to "background", or where a fractional value of the mask 350 is not 100% foreground.

The merge processor 240 receives the foreground image 430 from the foreground processor 220, receives the background image 440 from the background processor 230, and merges the images into an output image (e.g., output image 450, FIG. 4). In various embodiments, the merge processor 240 blends portions of the foreground image 430 with portions of the background image 440. In some embodiments, the merge processor 240 uses the metadata from the segmentation processor 210 to enlarge just the foreground image to cover unwanted areas in the background image or to provide higher clarity on the foreground while maintaining an original image size and bandwidth needed to transmit the original image.

In an embodiment, the merge processor 240 blends the foreground image and the background image using a mask (e.g., mask 350) from the segmentation processor 300. In some embodiments, the merge processor 240 upsamples the mask 350 to the target resolution using bilinear filtering or other suitable processing. In an embodiment, a blending function using the mask is $$C=a*F+(1-a)*b,$$

where a is a fractional value of the foreground over the background (1.0 if 100% foreground, 0.0 if 100% background), F is a corresponding pixel color value from the foreground image, B is a corresponding pixel color value from the background image, and C is the output color. The merge processor 240 may provide the output image to the computing device 110, a video encoder (not shown), or a data transmission apparatus (e.g., for communication to the computing device 120).

Figure 3A:
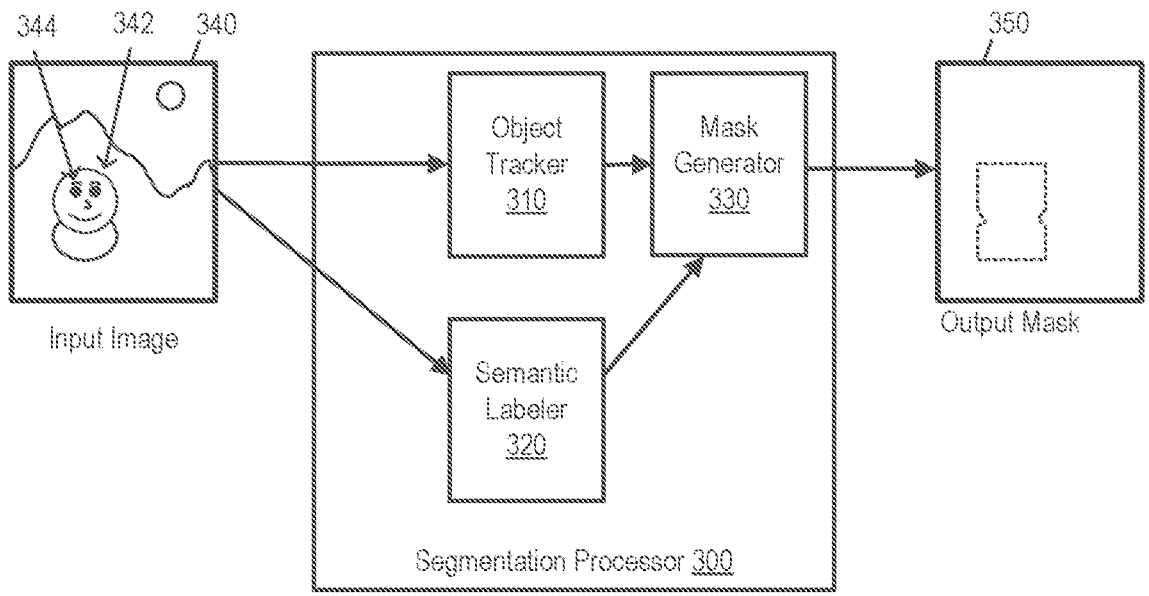
FIG. 3A shows a diagram of an example segmentation processor of the stream processor of FIG. 2, according to an embodiment.

FIG. 3A shows a diagram of an example segmentation processor 300 of a stream processor, such as the stream processor 200, according to an embodiment. The segmentation processor 300 includes an object tracker 310, a semantic labeler 320, and a mask generator 330.

The object tracker 310 is configured to identify and/or classify target objects within an input image, such as input image 340. The object tracker 310 may select unique identifiers for target objects within a stream of input images. For example, when a target object is identified, the object tracker 310 assigns a unique identifier to the target object that persists for a duration of the stream of input images. In some scenarios, the target object may not be identifiable in a subsequent input image. For example, the target object may be partially or totally obscured within one or more input images of a stream (e.g., obscured by another object such as a hat or book that passes in front of a user's face, obscured by a feature in the background such as a screen that the user walks behind, or hidden by moving out of frame) for a period of time, but return to the stream of input images at a later time (e.g., resume being identifiable). The object tracker 310 stores and maintains the unique identifier and associated metadata for the target object in a memory (e.g., stream data store 116), allowing the object tracker 310 to continue tracking the target object once it is no longer obscured in subsequent input images of the stream of input images, then tracking the target object (using the same unique identifier) and processing the target object (using the same processing technique) when it is no longer obscured.

The associated metadata may include displayed features of the target object (e.g., a texture attribute, a color attribute, an edge pattern attribute, a facial feature attribute, or other suitable attributes), motion data (e.g., display locations, estimated speed or velocity), or processing data (e.g., parameters for image processing performed on the target object). In some embodiments, the object tracker 310 includes a Kalman filter (not shown) for predicting a location of a target object that moves or is obscured. In an embodiment, the foreground processor 220 uses the unique identifier and associated metadata to use a same processing technique during the stream of input images. For example, the foreground processor 220 performs a color reconstruction process using the color processor 224 with consistent parameters or level of detail for the target object, allowing the target object to be consistently displayed in the output images (i.e., without significant changes in color that might otherwise appear due to noise or other small variations in the input images). Tracking the target object ensures that processing of the target object uses the same processing technique (e.g., color reconstruction, superresolution, etc.) during the stream of input images.

The object tracker 310 may provide a bounding box for tracked objects, the bounding box having an irregular shape or a regular shape (e.g., rectangle, circle, or ellipse), or a pixel mask where each pixel is associated with a classification, in various embodiments. In some embodiments, the object tracker 310 is an object classifier that recognizes and/or identifies one or more objects within the input image 340. In some embodiments, the object tracker 310 is configured to track faces and includes a facial recognition device or facial tracking device (not shown). The object tracker 310 is also configured to identify landmarks within a target object, in some embodiments. Examples of the landmarks, such as landmarks 344, may include eyes, nose, eyebrows, mouth, ears, lower face, etc. when the target object is a face or person. Other landmarks may include hats, headphones, jewelry, etc. In some embodiments, the object tracker 310 provides bounding boxes for the landmarks as well. The landmarks are fed back into the object tracker 310 for hysteresis and/or weighted history as objects move around an image.

The object tracker 310 in some embodiments is a face tracker. For each face, a region is memorized for the subsequent input image. If a current location of a detected face is related to a previously detected face, the current location is taken as the update to the previous location. This way, a temporally consistent labelling is possible, in other words, a target object will have a same label even as the target object moves around within an image (i.e., within a scene shown in the image). In some embodiments, the object tracker 310 uses a neural network model 114 to recursively update the estimate and take into account previous frames. The neural network model 114 may be a recurrent neural network model, a convolutional neural network model, or other suitable neural network model, in various embodiments. In an embodiment, a relationship between locations is established via overlap of the output regions. For each subsequent input image, a region is either updated via corresponding detection or predicted from the previous frame location, for example using a Kalman filter (not shown) and subsequent facial landmark detection. The output of the face tracker is turned into a binary mask by setting the pixels inside of the face regions to "foreground", the other pixels to "background."

In one embodiment, the object tracker 310 is extended to take into account optical flow from one or more previous frames within the stream of input images. To ensure consistency of colors between consecutive output images, the method uses the optical flow information between the input and its immediate previous frame. The optical flow of the input stream provides the information of pixels of the objects in the scene that have moved spatially within the view, in both x and y direction. This enables the segmentation processor 300 to calculate the object's movement in the pixel, which should be same for the enhanced images corresponding the input frames. During the training phase the pixel difference is computed for consecutive enhanced frames and the information is fed back to ensure color consistency of the system.

The semantic labeler 320 is configured to identify a group of pixels that contains an object and provide a label for the object. In some embodiments, the semantic labeler 320 provides a pixel mask that indicates locations of pixels where objects have been identified. For example, the semantic labeler 320 may classify every pixel in the input image according to a given class, such as "human" or "face." The output labels of the semantic labeler 320 may then be binarized according to the relevant class, and set to either "foreground" (for human or face) or "background" (not a human or face). In some embodiments, the semantic labeler 320 provides a pixel mask that labels hair adjacent to a detected face. This pixel mask may indicate to the mask generator 330 that the pixel mask should be very detailed so that detail is not inadvertently lost when blending in sensitive display areas, such as a user's hair.

The mask generator 330 is configured to receive the bounding boxes or pixel masks from the object tracker 310 and/or semantic labeler 320 and generate a mask, such as mask 350. The mask 350 may be a binary mask that classifies each pixel of the input image in one of the foreground or the background. In an embodiment, the mask generator 330 combines the bounding boxes from the object tracker 310 (e.g., for target objects and their landmarks) and the pixel masks from the semantic labeler 320 and generates the mask 350 to have a foreground that surrounds each of the bounding boxes. In some embodiments, the mask generator 330 averages two separate masks to obtain the mask 350, for example, by averaging a first mask based on the object tracker 310 and a second mask based on the semantic labeler 320. In an embodiment, the mask generator 330 generates the mask 350 using only the bounding boxes from the object tracker 310 (i.e., for detected faces and humans). By focusing the landmarks on facial parts and features that typically are adjacent to them, a smaller neural network model is generated as fewer specific filters are required to be learned. In another embodiment, the mask generator 330 generates the mask 350 using only the pixel mask from the semantic labeler 320.

The mask 350 is generated at an original resolution of the input image, in some embodiments. The mask 350 may then be upsampled to a higher resolution, for example, by bilinear filtering. In one embodiment, the mask 350 is turned into an "alpha mask" which gives a fractional value per pixel. This fractional value specifies how much of foreground or background processing should be taken into account for merging of the foreground image and background image. For example, a value of 0.7 may indicate that when merging the foreground and background, pixel values of the foreground and background are combined by multiplying a foreground pixel value by 0.7 and multiplying a background pixel value by 0.3, then adding the pixel values together (e.g., $PixelValue_{merged} = (0.7 \times PixelValue_{foreground}) + (0.3 \times PixelValue_{background})$.

Figure 3B:
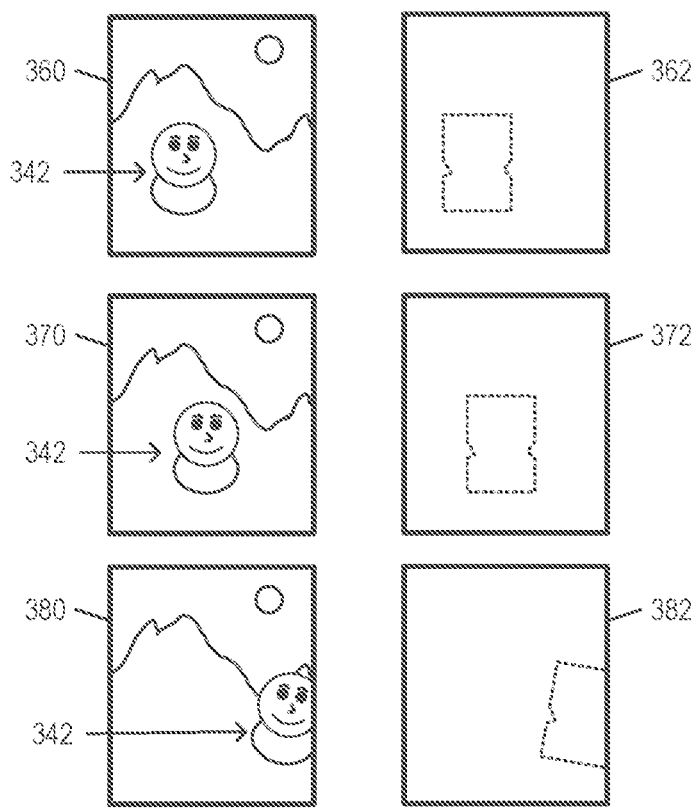
FIG. 3B shows diagrams of example input images and corresponding masks, according to an embodiment.

FIG. 3B shows diagrams of example input images and corresponding masks, according to an embodiment. The input images 360, 370, and 380 each include a subject user 342 that "moves" within the images and also rotates in the last input image 380. The corresponding masks 362, 372, and 382 are shown to the right of the corresponding input images 360, 370, and 380.

FIG. 4 shows a logical flow of images for improving image quality of a stream of input images, according to an example embodiment. Input images 410 are processed by the segmentation processor 210 or 300 and a mask (shown with dashed line) is generated to indicate a foreground 422 and background 424. A background image 440 is generated by the background processor 230, while a foreground image 430 having improved image quality is generated by the foreground processor 220. The foreground image 430 and the background image 440 each have a desired target resolution and target bitdepth. The merge processor 240 blends the foreground image 430 and the background image 440 to generate the output image 450.

Figure 5:
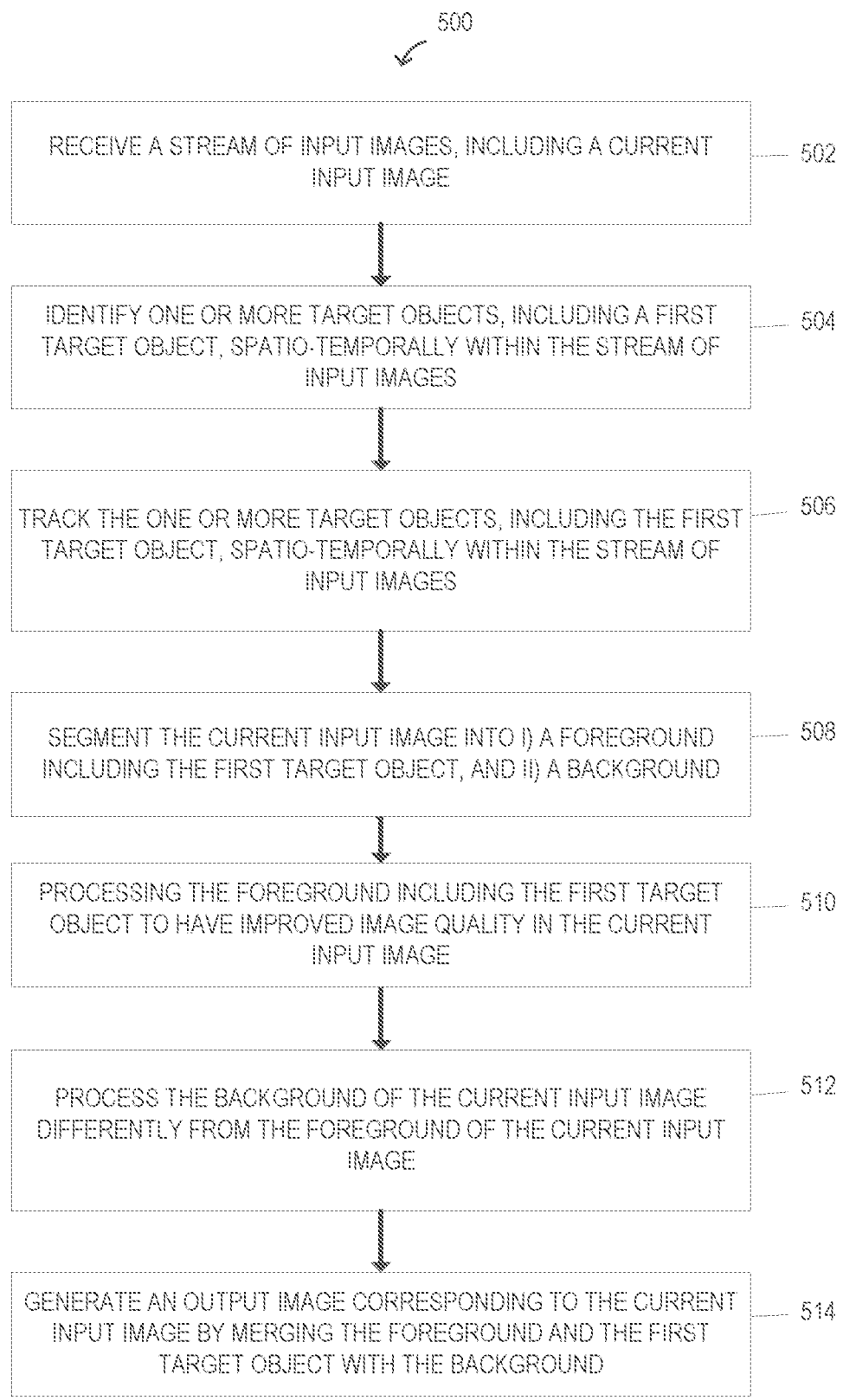
FIG. 5 shows a flowchart of an example method of improving image quality of a stream of input images, according to an example embodiment.

FIG. 5 shows a flowchart of an example method 500 of improving image quality of a stream of input images, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the stream processor 112, the stream processor 200, and/or the neural network model 114), or other suitable wireless communication device.

Method 500 begins with step 502. At step 502, the stream of input images is received, including receiving a current input image. The stream of input images may correspond to input images 410.

At step 504, one or more target objects, including a first target object, are identified spatio-temporally within the stream of input images. In an embodiment, the object tracker 310 may identify the one or more target objects.

At step 506, the one or more target objects, including the first target object, are tracked spatio-temporally within the stream of input images. For example, the object tracker 310 may track the subject user 342 among the plurality of input images 410. In an embodiment, step 506 further includes selecting a unique identifier for the target object during the stream of input images, storing the unique identifier and the metadata for the target object in a memory during the stream of input images, and ensuring that processing the target object uses the same processing technique during the stream of input images using the unique identifier and the metadata for the target object. In some embodiments, tracking the target object spatio-temporally within the stream of input images includes tracking the target object with the unique identifier using a recurrent neural network model including an error function that enforces an identification penalty for a changed identification of the target object. For example, the target object may be tracked using the neural network model 114.

In an embodiment, a classification of the target object is determined, wherein the metadata for the target object includes the classification. Processing the target object to have improved image quality comprises: selecting an image processing technique using the classification of the target object; selecting a level of detail, from a plurality of levels of detail for the image processing technique, using the metadata for the target object; and processing the target object using the selected image processing technique and the selected level of detail.

In an embodiment, determining the classification of the target object includes determining the classification as one of a face, an upper body, or a hand of a person. The metadata includes one or more of a texture attribute a color attribute, an edge pattern attribute, and/or a facial feature attribute. Processing the target object using the image processing technique may include processing the target object to maintain the one or more of the texture attribute, the color attribute, the edge pattern attribute, and/or the facial feature attribute.

At step 508, the current input image is segmented into i) a foreground including a target object, and ii) a background. The foreground and background may correspond to the foreground and background 422 and 424, respectively. In an embodiment, segmenting the current input image comprises generating a mask that identifies the foreground of the current input image. The mask may generally correspond to the mask 350, 362, 372, or 382 and be generated by mask generator 330, for example Generating the mask may include generating a pixel mask having a respective semantic label for each pixel. Generating the mask may include generating the mask for the target object at an original resolution of the current input image, and upsampling the mask to a target resolution of the output image before merging the foreground and the target object with the background.

At step 510, the foreground is processed by the foreground processor 220 to have improved image quality. The processing of the foreground may comprise processing the first target object using a same processing technique as for a prior input image of the stream of input images based on the tracking of the first target object. In some embodiments, the target object is processed based on metadata of the target object using a recurrent neural network model (e.g., neural network model 114). In an embodiment, the recurrent neural network is configured to perform one or both of a super-resolution process and/or a color reconstruction process. In some embodiments, the recurrent neural network model includes an error function that enforces a classification penalty for a changed classification of target objects and/or an error function that enforces an identity penalty for a changed identity of target objects.

In an embodiment, the foreground of the current input image comprises a plurality of target objects that includes first and second target objects. In this embodiment, step 506 may include tracking the plurality of target objects during each input image of the stream of input images and step 510 may include processing each of the plurality of target objects in the current input image using same respective processing techniques as for the prior input image of the stream of input images. In other words, each target object of the plurality of target objects may be tracked separately and have its own processing technique applied during the stream of input images.

At block 512, the background of the current input image is processed differently from the foreground of the current input image. For example, the background processor 230 may process the background image 440. In an embodiment, processing the background comprises replacing at least some pixels of the background with image data from a source other than the stream of input images.

At block 514, an output image is generated by merging the foreground and the target object with the background. The merging is performed by the merge processor 240, for example.

Figure 6:
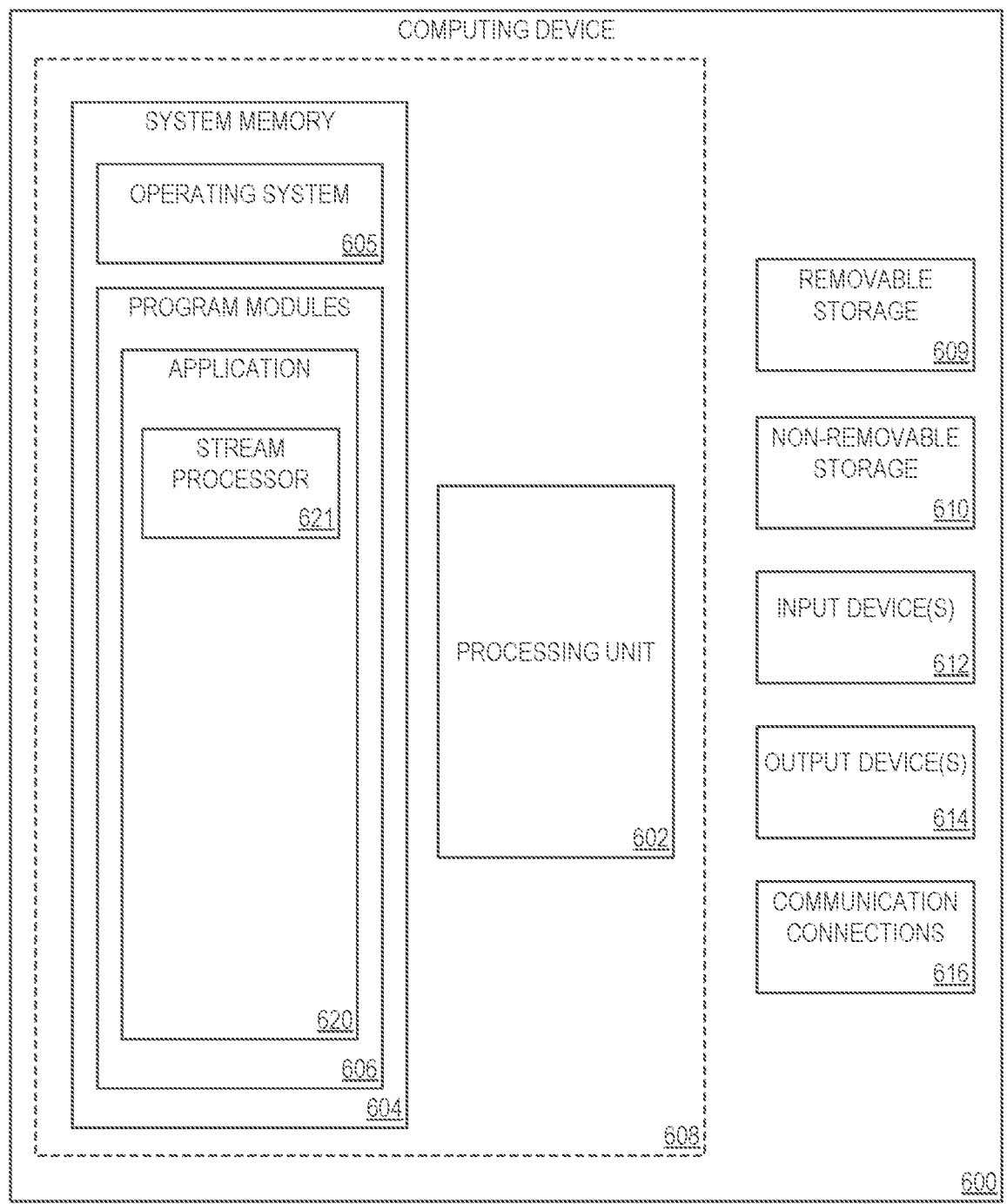
FIG. 6 is a block diagram illustrating example physical components of a computing device with which aspects of the disclosure may be practiced.
Figure 7:
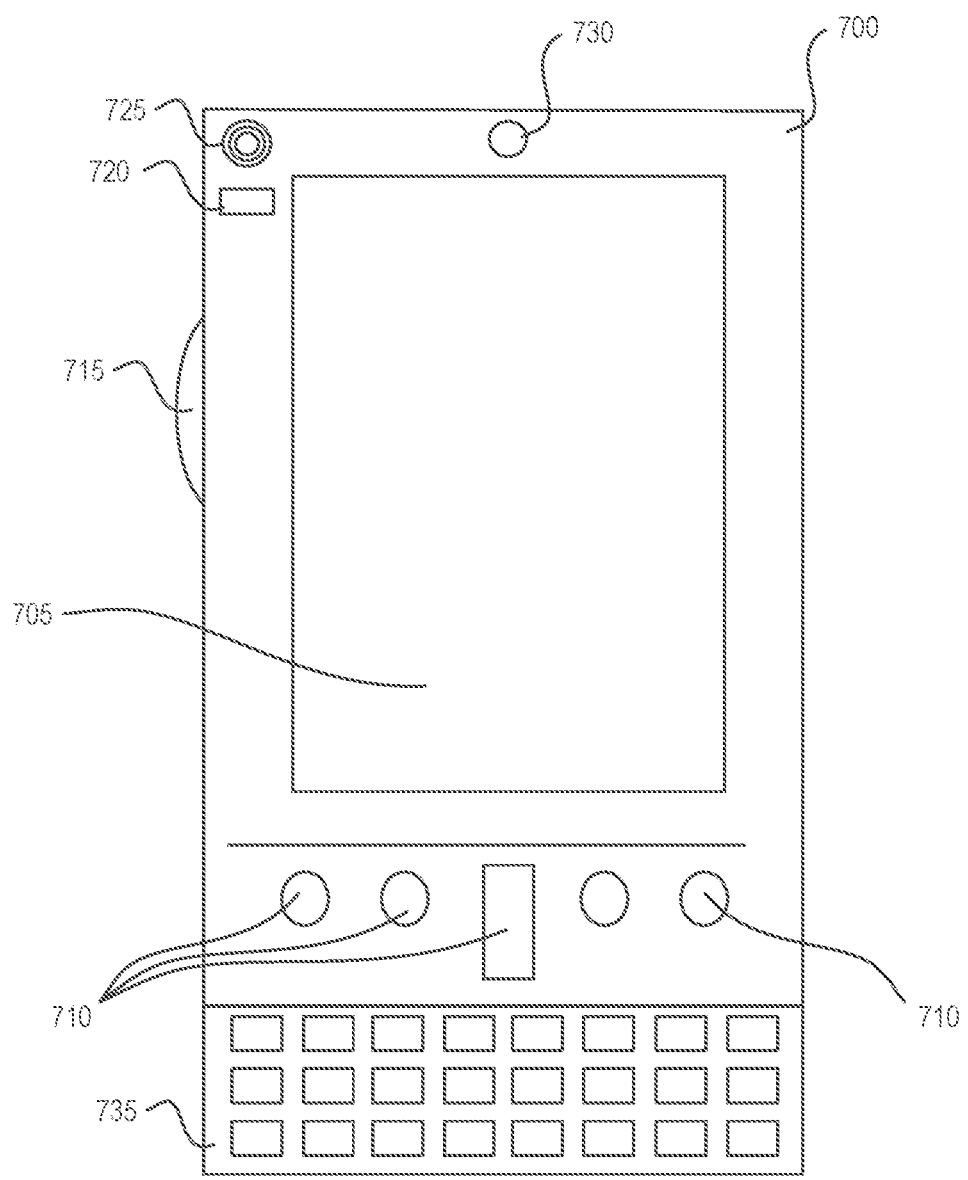
FIGS. 7 and 8 are simplified block diagrams of a mobile computing device with which aspects of the present disclosure may be practiced.
Figure 8:
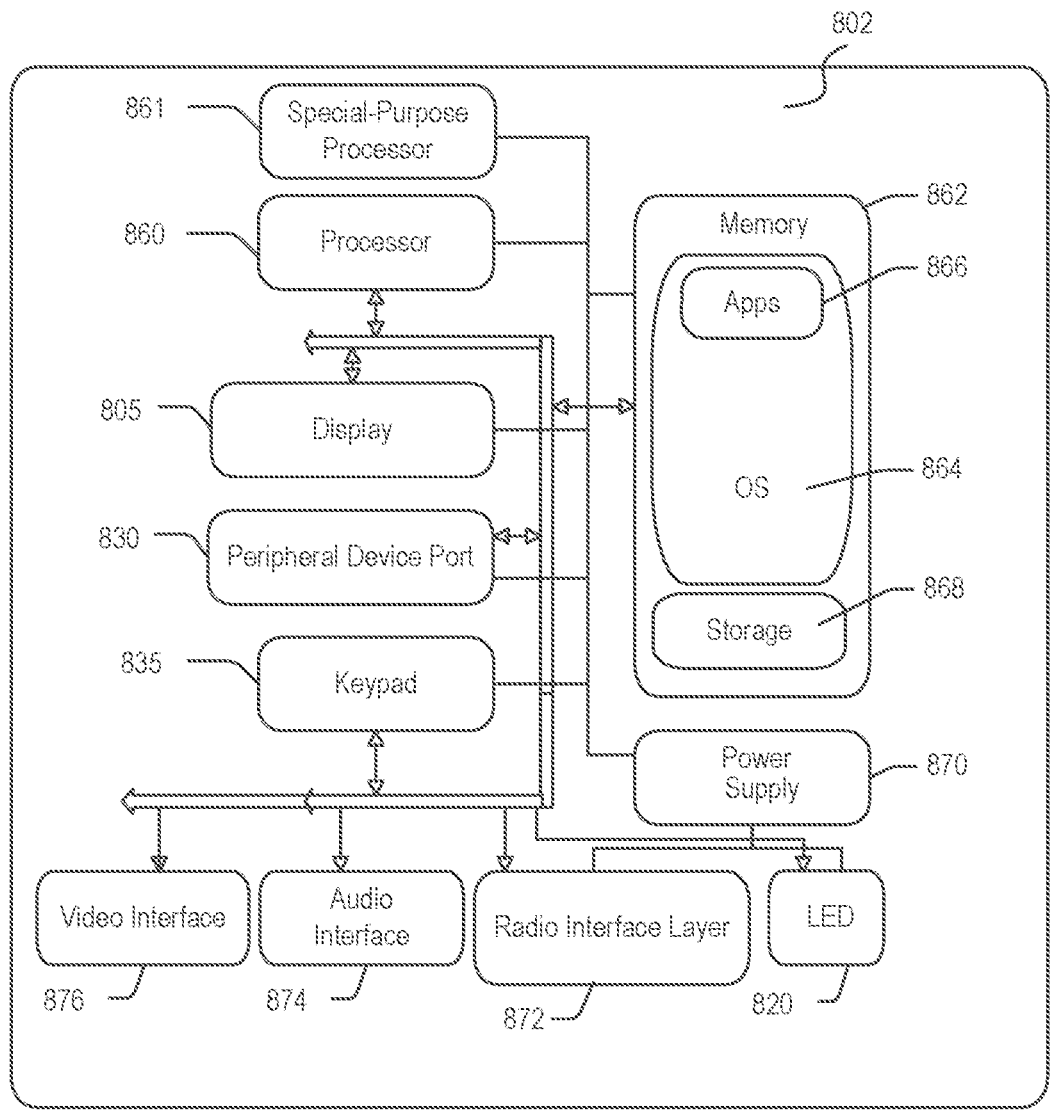

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing a stream processor application 620 on a computing device (e.g., computing device 110, computing device 120), including computer executable instructions for stream processor application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running power saving application 620, such as one or more components with regard to FIGS. 1-2 and, in particular, stream processor 621 (e.g., corresponding to stream processor 112).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., stream processor application 620) may perform processes including, but not limited to, the aspects, as described herein. Other program modules that may be used in accordance with aspects of the present disclosure, and in particular for allocating traffic to communication links, may include stream processor 621, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated embodiment, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of improving image quality of a stream of input images, the method comprising:
   receiving the stream of input images, including receiving a current input image;
   identifying one or more target objects, including a first target object, spatio-temporally within the stream of input images;
   tracking the one or more target objects, including the first target object, spatio-temporally within the stream of input images;
   segmenting the current input image into i) a foreground including the first target object, and ii) a background;
   processing the foreground to have improved image quality in the current input image, wherein the processing of the foreground further comprises processing the first target object using a same processing technique as for a prior input image of the stream of input images based on the tracking of the first target object using a neural network model, wherein the neural network model comprises an error function that enforces an identity penalty for a changed identity of the one or more target objects over the stream of input images, wherein a changed identity of the first target object comprises a removal or an inconsistent rendering of landmarks within the first target object over the stream of input images;
   processing the background of the current input image differently from the foreground of the current input image; and
   generating an output image by merging the foreground and the first target object with the background.

2. The method of claim 1, wherein processing the first target object comprises processing the first target object based on metadata of the first target object using the neural network model.

3. The method of claim 2,
   wherein tracking the one or more target objects comprises selecting respective unique identifiers for the one or more target objects.

4. The method of claim 2, wherein the neural network model includes an error function that enforces a classification penalty for a changed classification of target objects;
   wherein tracking the one or more target objects comprises determining respective classifications of the one or more target objects.

5. The method of claim 1, wherein tracking the one or more target objects comprises:
   selecting a unique identifier for the first target object during the stream of input images;
   storing the unique identifier and metadata for the first target object in a memory during the stream of input images; and
   ensuring that processing the first target object uses the same processing technique during the stream of input images using the unique identifier and the metadata for the first target object.

6. The method of claim 5, wherein tracking the one or more target objects comprises determining a classification of the first target object, wherein the metadata for the first target object includes the classification;
   wherein processing the first target object comprises:
      selecting an image processing technique using the classification of the first target object;
      selecting a level of detail, from a plurality of levels of detail for the selected image processing technique, using the metadata for the first target object;
      processing the first target object using the selected image processing technique and the selected level of detail.

7. The method of claim 6, wherein determining the classification of the first target object includes determining the classification as one of a face, an upper body, or a hand of a person.

8. The method of claim 5, wherein the metadata includes one or more of a texture attribute, a color attribute, an edge pattern attribute, and/or a facial feature attribute; and
   processing the first target object using the selected image processing technique comprises processing the first target object to maintain the one or more of the texture attribute, the color attribute, the edge pattern attribute, and/or the facial feature attribute.

9. The method of claim 1, wherein processing the background comprises replacing at least some pixels of the background with image data from a source other than the stream of input images.

10. The method of claim 1, wherein segmenting the current input image comprises generating a mask that identifies the foreground of the current input image.

11. The method of claim 10, wherein generating the mask comprises generating a bounding box that surrounds the foreground.

12. The method of claim 10, wherein generating the mask comprises generating a pixel mask having a respective semantic label for each pixel.

13. The method of claim 10, wherein generating the mask comprises:
   generating the mask for the first target object at an original resolution of the current input image; and
   upsampling the mask to a target resolution of the output image before merging the foreground and the first target object with the background.

14. The method of claim 10, wherein the mask is an alpha mask and merging the foreground and the first target object with the background comprises combining pixel values of the foreground with pixel values of the background according to the alpha mask.

15. The method of claim 1, wherein the foreground of the current input image includes a plurality of target objects that includes the first target object and a second target object;
   wherein tracking the one or more target objects includes tracking the plurality of target objects during each input image of the stream of input images;
   wherein processing the first target object using the same processing technique comprises processing each of the plurality of target objects in the current input image using same respective processing techniques as for the prior input image of the stream of input images.

16. The method of claim 15, wherein the stream of input images includes: i) a first subsequent input image that is after the current input image and does not include the second target object, and ii) a second subsequent input image that is after the first subsequent input image and includes the second target object;
   wherein the method further comprises:
      processing the second target object using a same processing technique in the second subsequent input image as for the current input image.

17. A system for improving image quality of a stream of input images, the system comprising:
   a processor, and
   a memory storing computer-executable instructions that when executed by the processor cause the system to:
   receive the stream of input images, including receiving a current input image;
   identify one or more target objects, including a first target object, spatio-temporally within the stream of input images;
   track the one or more target objects, including the first target object, spatio-temporally within the stream of input images;
   segment the current input image into i) a foreground including the first target object, and ii) a background;
   process the foreground to have improved image quality in the current input image, wherein the processing of the foreground further comprises processing the first target object using a same processing technique as for a prior input image of the stream of input images based on the tracking of the first target object using a neural network model, wherein the neural network model comprises an error function that enforces an identity penalty for a changed identity of the one or more target objects over the stream of input images, wherein a changed identity of the first target object comprises a removal or an inconsistent rendering of landmarks within the first target object over the stream of input images;
   process the background of the current input image differently from the foreground of the current input image; and
   generate an output image by merging the foreground and the first target object with the background.

18. The system of claim 17, further comprising processing the first target object based on metadata of the first target object using a neural network model, wherein the neural network model is configured to perform one or both of a superresolution process and/or a color reconstruction process.

19. The system of claim 17, wherein the neural network model further comprises an error function that enforces a classification penalty for a changed classification of the first target object.

20. A stream processor, comprising:
   a segmentation processor configured to:
      identify one or more target objects, including a first target object, spatio-temporally within the stream of input images;
      track the one or more target objects, including the first target object, spatio-temporally within the stream of input images; and
      segment the current input image into i) a foreground including the first target object, and ii) a background;
   a foreground processor configured to process the foreground to have improved image quality in the current input image, wherein the processing of the foreground further comprises processing the first target object using a same processing technique as for a prior input image of the stream of input images based on the tracking of the first target object using a neural network model, wherein the neural network model comprises an error function that enforces an identity penalty for a changed identity of the one or more target objects over the stream of input images, wherein a changed identity of the first target object comprises a removal or inconsistent rendering of landmarks within the first target object over the stream of input images;

a background processor configured to process the background of the current input image differently from the foreground of the current input image; and a merge processor configured to generate an output image corresponding to the current input image by merging the foreground and the first target object with the background.

* * * * *